(12) United States Patent
Maji et al.

(10) Patent No.: US 11,363,692 B2
(45) Date of Patent: Jun. 14, 2022

(54) ELECTRICAL APPLIANCE FOR CONNECTION TO AN AC SUPPLY AND A CONTROL METHOD

(71) Applicant: SIGNIFY HOLDING B.V., Eindhoven (NL)

(72) Inventors: Goutam Maji, Eindhoven (NL); Zhengyu Wang, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/765,308

(22) PCT Filed: Dec. 12, 2018

(86) PCT No.: PCT/EP2018/084567
§ 371 (c)(1),
(2) Date: May 19, 2020

(87) PCT Pub. No.: WO2019/134801
PCT Pub. Date: Jul. 11, 2019

(65) Prior Publication Data
US 2020/0389957 A1  Dec. 10, 2020

(30) Foreign Application Priority Data

Jan. 2, 2018 (WO) ................. PCT/CN2018/070014
Feb. 9, 2018 (EP) ..................................... 18156109

(51) Int. Cl.
*H05B 45/355* (2020.01)
*H05B 45/20* (2020.01)
*H05B 45/10* (2020.01)
*H05B 45/3725* (2020.01)
*H02M 1/42* (2007.01)
*H02M 7/04* (2006.01)

(52) U.S. Cl.
CPC ........ *H05B 45/355* (2020.01); *H02M 1/4208* (2013.01); *H02M 7/04* (2013.01); *H05B 45/10* (2020.01); *H05B 45/20* (2020.01); *H05B 45/3725* (2020.01)

(58) Field of Classification Search
None
See application file for complete search history.

(56) References Cited

U.S. PATENT DOCUMENTS

| | | | |
|---|---|---|---|
| 9,166,445 B2* | 10/2015 | Johnson, Jr. | ............ H02J 9/062 |
| 10,840,735 B1* | 11/2020 | Cooper | ............. H02J 13/00004 |
| 2009/0290387 A1 | 11/2009 | Wheeler et al. | |
| 2011/0248567 A1 | 10/2011 | Brown et al. | |
| 2012/0169300 A1* | 7/2012 | Rouaud | ................. H02J 3/1835 |
| | | | 323/210 |
| 2013/0026836 A1 | 1/2013 | Dighrasker et al. | |
| 2013/0107598 A1 | 5/2013 | Rojas | |

(Continued)

*Primary Examiner* — Amy Cohen Johnson
*Assistant Examiner* — James H Cho

(57) ABSTRACT

An electrical luminaire receives an AC supply as well as an auxiliary power supply. A power converter converts the AC power to supply a lighting element. A power factor associated with the AC supply is used as a control input for selecting an amount of power to be supplied from the two supplies. This enables the overall power factor to be controlled, for example to avoid financial penalties associated with the use of the AC supply with low power factor.

14 Claims, 3 Drawing Sheets

(56) References Cited

U.S. PATENT DOCUMENTS

| | | | |
|---|---|---|---|
| 2015/0001945 A1* | 1/2015 | Estes | H02S 40/36 |
| | | | 307/66 |
| 2015/0340908 A1* | 11/2015 | Chambon | H02J 7/0068 |
| | | | 307/66 |
| 2017/0271979 A1* | 9/2017 | McDougle | H02M 1/4225 |
| 2017/0279300 A1* | 9/2017 | Catalano | H02J 9/061 |
| 2018/0188018 A1* | 7/2018 | Brown | H05B 45/357 |
| 2020/0278097 A1* | 9/2020 | Pahlevaninezhad | H05B 45/46 |

* cited by examiner

ELECTRICAL APPLIANCE FOR CONNECTION TO AN AC SUPPLY AND A CONTROL METHOD

CROSS-REFERENCE TO PRIOR APPLICATIONS

This application is the U.S. National Phase application under 35 U.S.C. § 371 of International Application No. PCT/EP2018/084567, filed on Dec. 12, 2018, which claims the benefits of European Patent Application No. 18156109.3, filed on Feb. 9, 2018 and Chinese Patent Application No. PCT/CN2018/070014, filed on Jan. 2, 2018. These applications are hereby incorporated by reference herein.

FIELD OF THE INVENTION

This invention relates to electrical appliances supplied by AC, and in particular relates to the issue of maintaining a high power factor.

BACKGROUND OF THE INVENTION

Many devices which are driven by an AC input, such as a mains input, are provided with a power converter, for AC to DC conversion.

One function implemented within a power converter which is supplied with mains (or other AC) power is power factor correction (PFC). The power factor of an AC electrical power system is defined as the ratio of the real power flowing to the load to the apparent power flowing to the load. This apparent power is the vector combination of the real power and a reactive power component.

A power factor of less than one means that the voltage and current waveforms are not in phase or distorted, reducing the instantaneous product of the two waveforms. The real power is the capacity of the circuit for performing work in a particular time. The apparent power is the product of the current and voltage of the circuit. Mathematically, the power factor comprises information relating to both the harmonic power factor depending on harmonics and the displacement power factor depending on phase displacement.

Due to energy stored in the load and returned to the source, or due to a non-linear load that distorts the wave shape of the current drawn from the source, the apparent power will be greater than the real power.

If a power supply is operating at a low power factor, a load will draw more current for the same amount of useful power transferred than for a higher power factor.

The power factor can be increased using power factor correction. For linear loads, this may involve the use of a passive network of capacitors or inductors. Non-linear loads typically require active power factor correction to counteract the distortion and raise the power factor. The (passive) power factor correction brings the power factor of the AC power circuit closer to unity by supplying reactive power of opposite sign, adding capacitors or inductors that act to cancel the inductive or capacitive effects of the load.

Active PFC makes use of power electronics to change the waveform of the current drawn by a load to improve the power factor. Active PFC circuits may for example be based on buck, boost or buck-boost switch mode converter topologies. Active power factor correction can be single-stage or multi-stage.

The power factor is typically required to be greater than 0.9 for high power lighting, above 25 W. For professional lighting applications the power factor is also usually required to be equal to or larger than 0.9 even below an input power of 25 W.

Many utility companies charge commercial and industrial customers a penalty for having a poor power factor. Demand charges are billed in units of kVA which corresponds to the apparent power. Therefore any drop in power factor below 1 results in additional billed units of demand compared to the actual useful power utilized.

By way of example, one charging scheme involves charging customers the greater of their real power demand in kW or 90% of their apparent (kVA) demand. By this mechanism, there are additional demand charges for all customers with a power factor of less than 0.9. For example, a customer with a power factor of 0.85 and a peak demand of 850 kW (real) and hence 1000 kVA (apparent) would pay for 900 kVA of demand, or 50 extra units of demand relative to a customer with a power factor of 0.9 or better with the same real demand of 850 kW.

For customers in areas where demand charges are high, extra units of billed demand can result in significant costs.

Therefore, there are many reasons to avoid low power factor operation in power converters, for example to avoid consumption of extra chargeable apparent power instead of real wattage power.

US20110248567A1 discloses a power factor correction system that has a a charging system of a battery which charging system is also configured to deliver an input current to the power grid to adjust a power factor.

US20130107598A1 discloses a method to add locally generated real and reactive power to a power distribution grid.

SUMMARY OF THE INVENTION

It is a concept of the invention to make use of an auxiliary supply to take over supply from a main AC supply (e.g. a mains supply from a utility company). More specifically, the auxiliary supply and the main AC supply are selected based on a power factor of a system, so as to prevent a situation of a low power factor of the system being presented to the utility company, or so as to ensure a high power factor continues to be presented to the utility company. In this way, an overall higher power factor can be achieved. More specifically, the concept is implemented in a luminaire and according to an output lighting level of the lighting element, which output lighting level is inherently related to power factor.

The invention is defined by the claims.

According to examples in accordance with an aspect of the invention, there is provided an electrical luminaire comprising:

a lighting element having different output lighting levels;

a first input adapted to be connected to an AC supply;

a second input adapted to be connected to an auxiliary power supply;

a power converter connected to the first input and adapted to convert AC power from the AC supply to power a lighting element;

an interface adapted to receive a control signal identifying a power factor associated with the AC supply, wherein said control signal is associated with the lighting element and depending on the different output lighting level; and a controller adapted to:

select an amount of power to be supplied from the first input to the lighting element and an amount of power to be supplied from the second input to the lighting element, according to said control signal.

This luminaire takes account of the power factor associated with an AC supply, which power factor depends on a lighting element e.g. type and size being driven, its operation mode, etc., in order to determine whether to use that AC power supply or to switch to an auxiliary power supply. The auxiliary supply is for example a DC supply. There may be a financial penalty for using the AC supply with low power factor, and this penalty can be avoided by switching to the auxiliary supply to avoid using the AC power with low power factor. Alternatively, if using the AC supply can improve the overall power factor of the system, switching to the AC power from the auxiliary supply is also workable in case a high overall power factor is desired.

By identifying the power factor, the actual cost penalty can be determined (based on determining the total apparent kVA power), so that control measures can be taken to minimize the cost of energy usage.

It is known to switch between supplies for example to reduce energy cost, for example by charging a battery during off peak times and discharging during peak times. It is also known in US2009/290387A1 to switch between supplies to reduce power loss, for example switching to a battery when the lighting element is in a light-load condition to prevent that the AC/DC converter gives rise to a high power loss. The invention provides an alternative or additional control approach by which the power factor, (rather than power loss), is taken into account so that the actual energy cost can be monitored and used to determine how to allocate the alternate supplies (AC and auxiliary supply) to the lighting element.

The power converter for example includes power factor correction, and in such a case there already exists the hardware and software required to determine the power factor associated with the AC supply and the lighting element. This for example involves measuring the real power (using monitored current and voltage values) and measuring the apparent power (based on the RMS voltage and current values at the AC supply).

The control signal identifying a power factor may be an actual power factor value, but it may equally be the apparent power and real power values (hence enabling the power factor to be determined separately).

The controller is for example adapted to select an amount of power to be supplied from the first input and an amount of power to be supplied from the second input to the lighting element, further according to the prevailing total (apparent) power, kVA, and real energy tariff.

The overall energy cost when based on total apparent power (rather than power demand) for example incorporates a penalty relating to the prevailing power factor. Thus, the overall energy cost may be managed i.e. minimized by suitable time-shifting between the two supplies.

The energy tariff may for example be based on 90% of the apparent power demand or 100% of the real power demand, whichever is greater. It may instead be simply based on the apparent power consumption. In such cases, it may be financially worthwhile when there is a low power factor, to increase consumption of luminaires which operate at a higher power factor, to bring up the overall power factor. This will depend on the energy tariff at that time and on whether such time-shifting is possible for the consumer.

The battery is for example used to power the lighting element when the lighting element is operating at a low power factor. This may for example result from the settings of the luminaire. In addition, the power supply is preferably managed so that battery charging takes place during off-peak times and battery usage takes place during peak times. The controller will preferably also take into account the state of charge of the battery in determining the supply to be used for the lighting element, and thus includes a charge management system.

The auxiliary supply for example comprises a battery. The battery as the auxiliary supply is for example part of the luminaire.

The luminaire thus has an integrated battery for use in the power factor management of the invention, but it also may be used for demand management, for example to implement battery charging during off-peak times of the AC supply and to provide a supply during peak times. The auxiliary supply may also function to provide an emergency backup power supply.

The controller is for example adapted to select power from only one of the first input and said second input according to said control signal, and wherein said controller is preferably adapted to isolate the power converter from the AC supply when selecting power from said second input.

In this way, a simple control scheme is possible, whereby one or the other power supply is selected for delivery of power to the lighting element. More complicated power sharing mechanisms are of course possible. The preferable isolation of the power supply ensures that the power converter no longer draws power from the AC supply when the auxiliary supply is being used.

The controller is for example adapted to select the second input in response to the control signal indicating a power factor of the luminaire itself lower than a first threshold and/or select the first input in response to the control signal indicating a power factor of the luminaire itself higher than a second threshold.

Thus, when using the second input (the auxiliary supply) the power factor is improved. By way of example, there may be a power factor target of 0.9. It may then be desirable to avoid powering the luminaire from the AC supply when the power factor is below 0.9, or equivalently to use the AC supply when a power factor of greater than 0.9 can be achieved.

The interface (which receives the control signal identifying the power factor) may comprise:

a detector 62 to detect the power factor of the power converter; or a communication module 64 to receive the control signal from a remote device which is coupled to a set of electrical luminaires including the present electrical luminaire.

The power factor determination may thus be performed locally at each luminaire (for example using the existing hardware of a power factor correction unit) or it may be performed remotely for a set of the luminaires. The charging penalty relating to operation at a low power factor is applied to the overall supply, so if there are multiple luminaires being powered from the AC supply, an overall evaluation of the prevailing power factor is desirable. In this case, there may be a global power factor evaluation as well as local power factor detection so that the local luminaires can be identified which are able to contribute to a global power factor improvement.

By way of example, if the lighting element is operating with a setting corresponding to the peak or middle of its rated power, the converter for the lighting element may have a high power factor thus the luminaire can connect to AC; a low power mode of an luminaire generally results in a lower power factor thus it is preferable, in terms of power factor, then to connect the luminaire to the auxiliary supply.

The luminaire thus is a dimmable luminaire. The dimming setting strongly influences the power factor. In particular, a low dimming set (i.e. low brightness) correlates with a low power factor.

The above aspect focuses on compensating the power factor of the luminaire itself. Alternatively, another aspect of the invention is compensating the power factor of other appliances in the system.

The controller is for example adapted, preferably at off peak hours, to:

determine if a power factor of the power converter itself is higher than a third threshold, and if it is:
  to select the first input in response to the control signal indicating that a power factor of a system of other appliances is lower than a fourth threshold; and
  to select the second input in response to the control signal indicating that the power factor of the system of other appliances is higher than the fourth threshold.

This uses the AC power converter when operating at a high power factor (i.e. above the third threshold) to compensate for a low power factor of other appliances (i.e. below the fourth threshold, which is for example lower than the third threshold). This is preferably at off peak hours when the deliberate additional usage of the power converter (and hence additional power demand) is financially better than allowing overall operation at a lower power factor. Thus, it makes deliberate additional use of the power converter to increase the overall power factor, when there is flexibility in the timing of this additional usage.

The power factor associated with the AC supply for example comprises the combination (e.g. product) of the harmonic power factor and the displacement power factor. A system may for example comprise some units which mainly generate harmonic power factor (such as an LED driver) and some units which mainly generate displacement power factor (such as a heating, ventilation and air conditioning system).

The power factor measured in this system takes account of the overall influence of both distortion and displacement. It may also be that the system or the appliance itself only generates one of the harmonic power factor and displacement power factor, and the invention can be still be used for compensation.

There may be a system of multiple luminaires, with global power factor measurement, or local power factor measurement or both.

The invention also provides a system of appliances connected to a shared AC supply, wherein at least one appliance is the luminaire as defined above, and wherein the system further includes one or more of:
  a heating, ventilation and air conditioning appliance; and
  IT system appliances.

The invention may thus be applied to an installation of multiple appliances of different types. The aim is to enable power factor optimization and thereby energy cost optimization for the overall installation.

The invention also provides a method controlling an electrical luminaire having an output lighting element, comprising:
  providing access to an AC supply to the luminaire and performing power conversion thereby to convert AC power from the AC supply for supply to the lighting element;
  providing access to an auxiliary power supply to the luminaire;
  receiving or generating a control signal relating to a power factor associated with the AC supply; and
  selecting an amount of power to be supplied from the AC supply and an amount of power to be supplied from the auxiliary power supply to the output lighting element according to said control signal.

This method takes account of the power factor associated with an AC supply and the luminaire lighting element in order to switch between an AC power supply and an auxiliary power supply.

The method may comprise selecting an amount of power to be supplied from the first input and an amount of power to be supplied from the second input to the lighting element, further according to the prevailing total apparent power, kVA, and the energy tariff.

The output lighting element may have a plurality of output modes, wherein the power factor associated with the AC supply depends on the output mode of the output lighting element, for example wherein the output lighting element comprises a luminaire and said output modes comprise different output lighting levels.

The step of selecting is for example for only selecting the auxiliary power supply in response to the control signal indicating a power factor of the luminaire itself lower than a first threshold and/or only selecting the AC supply in response to the control signal indicating a power factor of the luminaire itself higher than a second threshold. This provides a simple binary control approach. A more complicated analog load sharing approach may instead be used.

The invention may be implemented, at least in part, in computer software.

These and other aspects of the invention will be apparent from and elucidated with reference to the embodiment(s) described hereinafter.

BRIEF DESCRIPTION OF THE DRAWINGS

Examples of the invention will now be described in detail with reference to the accompanying drawings, in which.

DETAILED DESCRIPTION OF THE EMBODIMENTS

Figure 1:
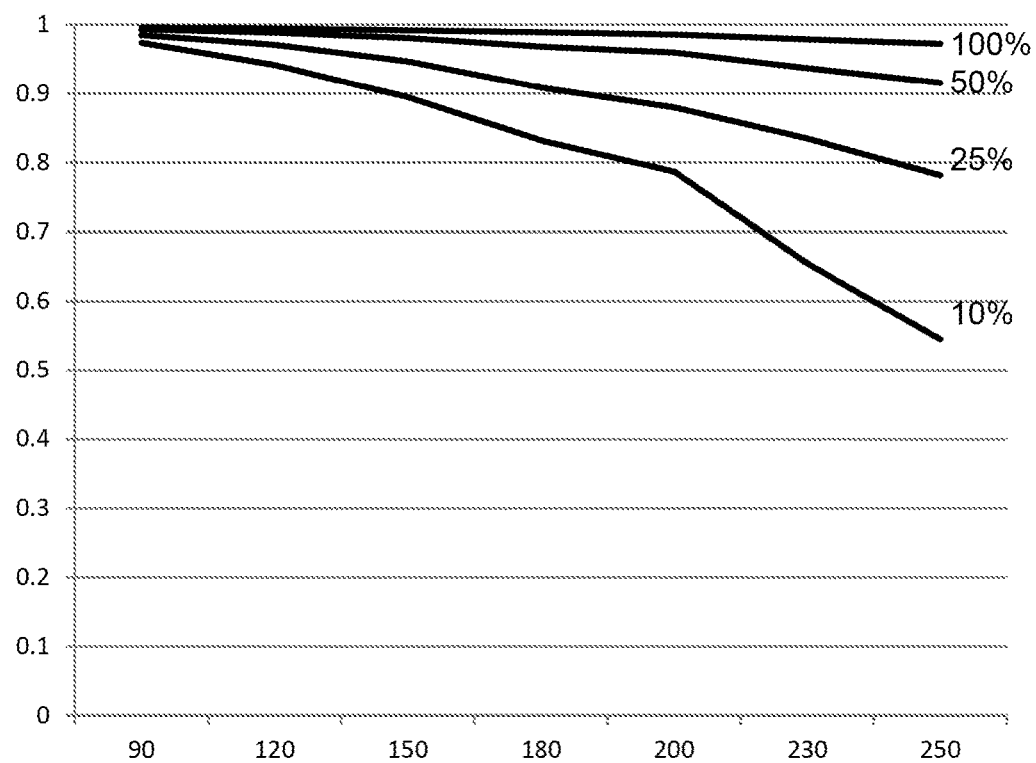
FIG. 1 shows a graph of the power factor versus the operating voltage for one example of a lighting driver.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides an electrical appliance which is accessible to an AC supply as well as an auxiliary power supply. A power converter converts the AC power to supply a load. This power converter is usually a PFC AC/DC converter. the appliance may further comprises a DC/DC converter between the PFC AC/DC converter and a load. A power factor associated with the AC supply is used as a control input for selecting an amount of power to be supplied from each of the two supplies. This enables the overall power factor to be controlled, for example to avoid financial penalties associated with the use of the AC supply with low power factor.

The invention is of interest generally for AC driven appliances. One particular application of interest is for lighting circuits, and the invention will be described in connection with this example.

FIG. 1 shows a graph of the power factor (y-axis) versus the operating voltage (x-axis) for one example of a 75 W lighting driver based on a switch mode power supply. This is for a universal driver capable of operating at any AC input voltage in the range RMS 90V to 265V.

Four plots are shown for different load state, shown as percentages. These load states represent dimming levels for the LED lighting load.

At 100% load (i.e. full brightness operation) the driver typically offers a power factor of greater than 0.97 PF for all voltage inputs, whereas the power factor drops to 0.85 at 230V AC when the load level is at 25% (or lower). The power factor becomes lower as the dimming level becomes lowers.

For example if a 40 W luminaire (i.e. drawing a real power of 40 W) offers a power factor of 0.98 at full load condition, this means the luminaire draws an apparent power of 40/0.98=40.81 VA. This means only 0.81 VA extra VA power which may be chargeable (depending on the pricing scheme). The reactive power component is:

$$\sqrt{((40/0.98)^2 - 40^2))} = 8.12 \text{ W}.$$

If the same luminaire operates at 25% load (hence 10 W power) and offers just a power factor of 0.85 then the extra apparent power will be (10/0.85−10)=1.76 VA. Even if a charge is only made based on 90% of the apparent power, there is still a chargeable additional power of 0.58 VA (11.76×0.9−10). The reactive power component in this case is:

$$\sqrt{((10/0.85)^2 - 10^2))} = 6.19 \text{ W}.$$

Therefore, this example of luminaire at 100% dimming (full brightness mode) consumes 40 W real power and only 8.12 W reactive power with a power factor of 0.98. The same luminaire consumes 6.19 W of reactive power when the real power is only 10 W because of the lower power factor of 0.85. Hence a luminaire consumes a high ratio of reactive power when operated at a low power factor, and this can result in charges by the utility supplier based on the apparent power.

Therefore, the invention is based on shifting the luminaire power to an auxiliary supply such as an internal battery when the power factor is low. This may for example be when the input voltage is high (e.g. 230-265V AC RMS) and when the requested dimming is low such as less than 40%.

Alternatively, the output lighting level is color/color temperature level like warm, middle and cold. The luminaire can switch between battery and the AC mains supply when its color temperature changes which is also associated with a change in power factor of the driver of the luminaire. For example, the luminaire/driver has high power factor in emitting one color/color temperature and low power factor in emitting another color/color temperature. This may be a result of having different drivers for different color/color temperatures. When the color/color temperature associated with high power factor driver, AC mains supply can be used; and when the color/color temperature associated with low power factor driver, the auxiliary supply such as battery can be used. This is just another example and there could be other implementations covered by the claims of the invention. In yet another example, the beam angle levels of the luminaire of narrow, middle, and wide are the output lighting level as long as those different beam angle levels are associated with different power factor of the luminaire. The term "output lighting level" aims to cover any characteristic of the output light that can be measured as level, and the combination of these characteristics.

Normally many lighting products are rated for universal grid voltage operation i.e. 90-265V AC, RMS. Therefore, when the input voltage is at the higher side but within the workable range e.g. 260-265V AC, the power factor drops compared to the circuit operation at 90-110V AC RMS with the same loading condition.

The invention is based on using the actual power factor at any time to determine whether to use the main AC supply or to switch either fully or partially to the auxiliary supply.

Figure 2:
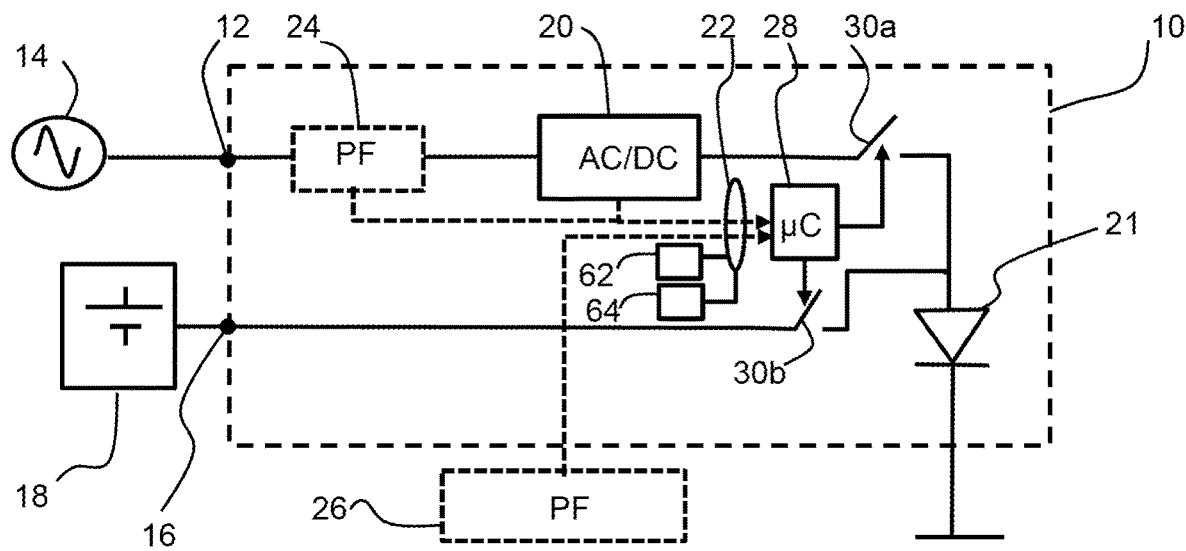
FIG. 2 shows an example of an electrical appliance.

FIG. 2 shows an example of an electrical appliance 10 comprising a first input 12 adapted to be connected to an AC supply 14 and a second input 16 adapted to be connected to an auxiliary power supply 18.

In the example shown, the auxiliary power supply 18 is external to the appliance, but it may be internal (in which case the second input 16 is internal to the overall appliance rather than an external input). The auxiliary power supply is for example a DC battery. It may be used for power factor control as described, but it may of course also perform the conventional function of providing an emergency backup power supply and/or providing load shifting between peak and off-peak times. Other implementations of the auxiliary power supply comprise renewable power sources like solar panels or wind/wave turbines.

A power converter 20 is connected to the first input 12 and adapted to convert AC power from the AC supply to power a load. The power converter is for example a switch mode power supply (SMPS). It includes an AC-DC converter such as a diode bridge rectifier which then supplies a DC voltage to the switching stage. The switching stage comprises an energy commutating element, typically an inductor, and a main control switch which controls the coupling of the input energy to the energy commutating element and the coupling of the energy commutating element to the output. The power converter also incorporates power factor correction.

One example of suitable power factor correction (PFC) unit for a switch mode power supply is a PFC boost converter which is for example inserted between the bridge rectifier and a mains storage capacitor. The boost converter attempts to maintain a constant DC bus voltage on its output while drawing a current that is always in phase with and at the same frequency as the line voltage.

The PFC unit is separate to another main switch mode circuit (not shown) of the power converter 20 that produces the desired output voltage or current from the DC bus. The main switch mode circuit thus functions as a controllable DC/DC converter. There may be current feedback or voltage feedback to provide control of the main switch mode circuit thereby to deliver a desired output current or voltage to the load.

Both the AC/DC PFC unit and the DC/DC switch mode power supply are conventional and are not altered by the approach of the invention.

The appliance has a load 21, which in the example shown is an LED arrangement (schematically represented as a single LED). The invention may however be applied to other types of lighting load (such as compact fluorescent lighting) or indeed to other types of load altogether.

The appliance 10 further comprises an interface 22 which receives a control signal identifying a power factor associated with the AC supply 14 (and which also depends on the load being driven).

This power factor signal may be generated internally or it may be received externally. Three alternative sources for this control signal are shown in FIG. 2. The first and a second sources are internal and the third source is external. The first possible internal source is an output from the power converter 20 in case the AC/DC PFC power converter has built-in PF measuring circuit. Alternatively the second possible internal source is a separate internal power factor measurement unit 24 placed between the AC supply 14 and the AC/DC PFC converter. The third possible source is an external power factor measurement unit 26. The external unit may provide power factor information about a set of appliances of which the appliance shown forms one element. In this case, the interface 22 includes a communications module for receiving the external communications signal, either in a wired or wireless manner. Different solutions may make use of one or more of the possible sources of power factor information.

A controller 28 is adapted to select an amount of power to be supplied from the first input 12 to the load 21 and an amount of power to be supplied from the second input 16 to the load, according to said control signal.

This appliance thus takes account of the power factor associated with the AC supply in order to determine whether to use that AC power supply or to switch to an auxiliary power supply. By identifying the power factor, the cost penalty can be determined, in that both the apparent power and the real power may be determined. The control can thus aim to minimize the cost of energy usage.

In a first approach, the power converter 20 senses the input utility grid voltage and current, from which it can estimate the power factor. In particular, the existing monitoring circuitry to implement power factor correction, as explained above, provides the required information to determine the power factor.

When the internal power factor measurement unit 24 is used, direct power factor sensing is used to provide a direct indication of the power factor.

The power factor can in this way be estimated at individual luminaires and can be easily calculated using digital sampling measurement of the voltage and current drawn by the luminaires. The product of the voltage and current is the real power consumption:

$P(\text{real}) = 1/T \int_0^T v(t) * i(t) dt$ $U(\text{rms}) = \sqrt{1/T \int_0^T v(t)^2 dt}$ $I(\text{rms}) = 1/T \int_0^T i(t)^2 dt$ As shown in the equations above, the instantaneous voltage is multiplied by the instantaneous current and then integrated over time (such as one full cycle) to calculate the real power.

The RMS value of the voltage and of the current are also calculated by taking the square root of the squared voltage and current components over time (again such as one full cycle). The product of these RMS values is the apparent power.

This method of RMS measurement can be applied to any type of waveform (sine or distorted) with any harmonic content up to the bandwidth of the instrument.

The power factor can be calculated based on the ratio between the real power and the apparent power as shown below:

$$PF = \frac{\text{Real power}}{\text{Apparent power}} = \frac{P(\text{real})}{U(\text{rms}) * I(\text{rms})}$$

i.e.

$$PF = \frac{\text{Real power}}{\text{Apparent power}} = \frac{1/T \int_0^T v(t) * i(t) dt}{U(\text{rms}) * I(\text{rms})}$$

The controller 28 may select an amount of power to be supplied from the first input and an amount of power to be supplied from the second input to the load, further taking into account the energy tariff being followed. The overall energy cost when based on total apparent power (rather than power demand) for example incorporates a penalty relating to the prevailing power factor as explained above. Thus, the overall energy cost may be managed i.e. minimized by suitable time-shifting between the two supplies.

As explained above, for a lighting load, the power factor may be the result of the operating settings of the lighting load. The result is that at low dimming levels (i.e. low brightness) there is a preference to use the auxiliary supply. The battery will need charging, and the system is preferably managed so that battery charging takes place during off-peak times and battery usage takes place during peak times. The controller 28 thus also implements a battery charging algorithm so that the switching actions also take into account the state of charge of the battery. There may be conflicting demands for battery charging (when there is a low state of charge) and for battery use (when there is a low power factor), and the controller implements an algorithm which operates to manage these various demands as well as the desire to maintain most efficient energy usage (either as minimum reactive power consumption and/or minimum cost taking account of the pricing tariffs). Battery charging can for example be enabled during low dimming operation to improve the power factor, by operating the whole system at its rated power.

The selection between the two supplies may be binary i.e. power is selected from only one of the first input and said second input according to said control signal. This is for example shown in FIG. 2 by the switches 30a and 30b. They are in series between a respective one of the inputs 12, 16 and the load 21. Thus, they can couple or isolate each power supply from the load. If they are operated in complementary manner, then this binary control is implemented.

However, more complicated power sharing mechanisms are of course possible. These may be based on power transfer switches which can select an amount of power to be transferred from the input to the output. For example, very low speed pulse width modulation (PWM) signals (for example with time period between 1 and 200 minutes) may be used for low speed time-sequential operation, or else high speed PWM may be used (with time period between 1 ms and 1s) to provide more continuous power sharing between the two sources to achieve a desired average power factor.

When the load is isolated from the power converter 20, the power converter no longer draws power from the AC supply when the auxiliary supply is being used. The switch 30a may be provided between the first input 12 and the power converter to isolate the input rather than the output of the converter.

The switching decisions may for example be based on threshold values of the measured power factor.

For example, the controller may select the second input 16 in response to a power factor measured at the appliance itself lower than a first threshold of e.g. 0.9 and/or select the first input 12 in response to the control signal indicating a power factor measured at the appliance itself higher than a second threshold. This second threshold may be the same (0.9) or higher e.g. 0.95. This approach is to deliberately use the auxiliary supply to bring up the power factor and/or to use the main AC supply when the power factor is high. The auxiliary supply may be seen as a backup supply. This approach for example relates to the control of the appliance as an independent unit.

The appliance may instead be controlled as part of a set of appliances.

It is then possible to make use of the main AC supply when the power factor is high to compensate for other appliances with a low power factor. This is for example particularly desirable when the cost of electricity is low.

If a power factor of the power converter itself is higher than a third threshold (e.g. 0.95) it can be used to compensate for other appliances. In this case the first input 12 is selected when the power factor of a system of other appliances is lower than a fourth threshold (e.g. 0.85).

This uses the AC power converter when operating at a high power factor (i.e. above the third threshold) to compensate for a low power factor of other appliances (i.e. below the fourth threshold, which is for example lower than the third threshold). This amounts to deliberate additional usage of the power converter. This may for example be used for battery charging.

Alternatively, the second input 16 is selected when the power factor of the system of other appliances is higher than the fourth threshold. This means the system power factor is already high, and there is no need to use the appliance to pull it higher.

Figure 3:
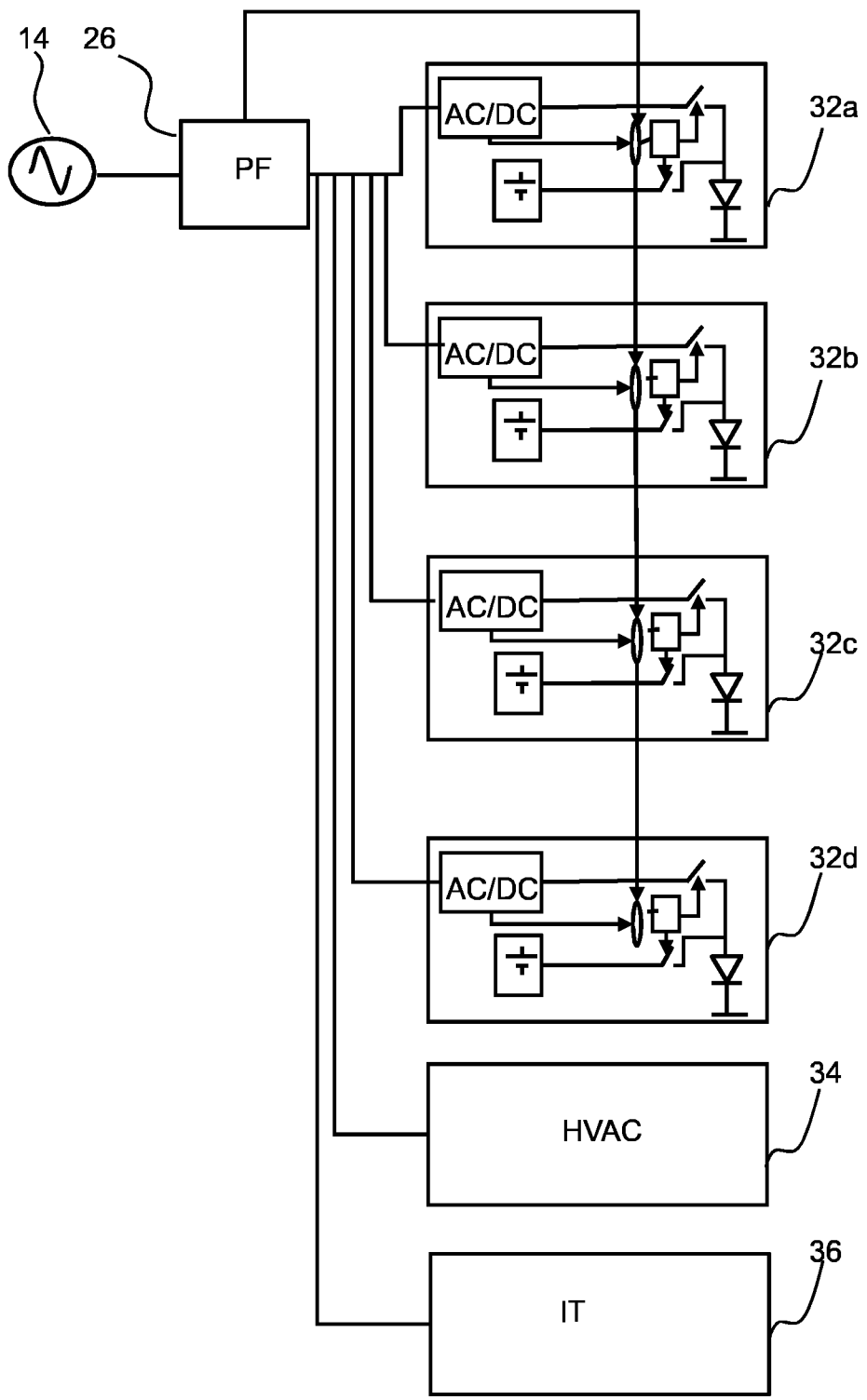
FIG. 3 shows a system of appliances connected to a shared AC supply.

FIG. 3 shows a system of appliances connected to a shared AC supply 14. It comprises a set of luminaires 32a to 32d as described above, a heating, ventilation and air conditioning appliance 34 and IT system appliances 36.

The aim of the control is to enable energy cost optimization for the overall system.

The power factor associated with the overall AC supply is measured by a unit 26 external with respect to each luminaire, and the internal unit 24 in each luminaire mentioned above is omitted. It measures the combination (e.g. product) of the harmonic power factor (otherwise known as "distortion power factor") and the displacement power factor. A system may for example comprise some units which generate a low harmonic power factor normally resulting from a non-linear load such as switching elements (such as an LED driver or the power supply in IT appliances) and some units which generate a low displacement power factor normally resulting from a linear load such as inductors and capacitors (such as a heating, ventilation and air conditioning system).

The power factor measured in this system takes account of the overall influence of both types of power factor.

The harmonic (distortion) power factor in particular also correlates with the total harmonic distortion (THD). Thus, by shifting luminaires to internal battery control, the harmonic power factor seen at the overall supply is increased and hence the total harmonic distortion is reduced.

The power factor is estimated at system level and provided as the external input and is provided to each luminaire 32a-32d. Optionally, each luminaire additionally locally measures its own power factor. When there is a low power factor detected, the system can instruct the luminaires, preferably those with low dimming level, to switch to battery operation. Alternatively, it can instruct luminaires having a locally measured power factor below a threshold to switch to battery supply.

Typical commercial and industrial buildings consume 25-30% of their total electricity for the lighting load and 35-40% for their HVAC loads, depending on the geographical location. However, the lighting load is able to run with the highest power factor, for example as high as 0.98 whereas a conventional HVAC load operates at a power factor of around 0.7. The HVAC load typically has motors which run at a power factor of 0.7-0.8 when at full load but this drops below 0.5 when at 25% load.

By way of example, there may be a lighting load of 1000 VA which is 25% of the load in a building, and 1500 VA HVAC load which is 37.5% of the load in the building.

For the lighting load the active (real) power is 980 W and the apparent power is 1000 VA for a power factor of 0.98.

For the HVAC load, the active (real) power is 1050 W and the apparent power is 1500 VA for power factor of 0.7.

The total system level power factor will be calculated as: PF (combined)=Total active power/total apparent power= (980+1050)/(1000+1500)=0.812.

Hence, the overall power factor improves when added load with high power factor is present and it compensates for the low HVAC load power factor of 0.7. Therefore, when an overall cost of electricity is low, the power factor penalty this solution is workable by switching the high power factor load (e.g. luminaire) when at its highest power factor to compensate the overall power factor. This will increase the overall demand so is of interest when the demand can be shifted. The increased overall demand makes the approach interesting for off peak times.

During peak times, it is of course beneficial to reduce the load rather than running at a high load with only slightly better power factor.

Another approach is to switch luminaires at low power factor (<0.7) from AC mains to battery in order not to worsen the HVAC power factor when the HVAC power factor is better than the luminaires.

IT loads 36 are very critical to worsen the power factor of an overall system if they are not power factor corrected, or when laptops are fully charged but connected with adaptors i.e. in a trickle charging mode (low power mode). By sensing the dynamic power factor operation of these IT devices, the system can plan the power operation of the luminaires The invention is of particular interest for indoor or outdoor lighting applications in where deep dimming luminaire operation is expected. However, it is of interest generally for loads which have different operating modes giving different power factors.

Figure 4:
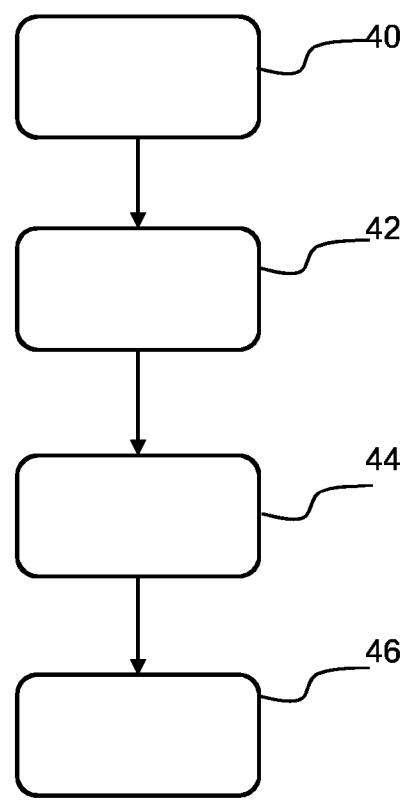
FIG. 4 shows a method controlling an electrical appliance.

FIG. 4 shows a method controlling an electrical appliance having an output load, comprising:

in step 40 providing access to an AC supply to the appliance and performing power conversion thereby to convert AC power from the AC supply for supply to the load;

in step 42 providing access to an auxiliary power supply to the appliance;

in step 44 receiving or generating a control signal relating to a power factor associated with the AC supply; and in step 46 selecting an amount of power to be supplied from the AC supply and an amount of power to be supplied from the auxiliary power supply to the output load according to said control signal.

Figure 5:
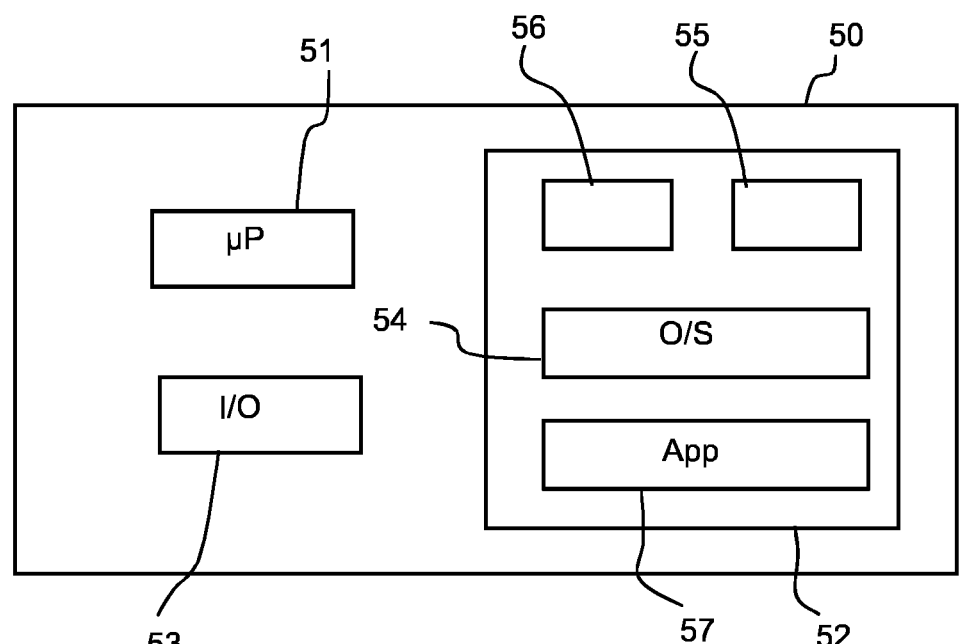
FIG. 5 illustrates an example of a computer 50 for implementing the controller used in the appliance of FIG. 2.

The system described above makes use of a controller or processor for processing data. FIG. 5 illustrates an example of a computer 50 for implementing the controller or processor described above.

The computer 50 includes, but is not limited to, PCs, workstations, laptops, PDAs, palm devices, servers, storages, and the like. Generally, in terms of hardware architecture, the computer 50 may include one or more processors 51, memory 52, and one or more I/O devices 53 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 51 is a hardware device for executing software that can be stored in the memory 52. The processor 51 can be virtually any custom made or commercially available processor, a central processing unit (CPU), a digital signal processor (DSP), or an auxiliary processor among several processors associated with the computer 50, and the processor 51 may be a semiconductor based microprocessor (in the form of a microchip) or a microprocessor.

The memory 52 can include any one or combination of volatile memory elements (e.g., random access memory (RAM), such as dynamic random access memory (DRAM), static random access memory (SRAM), etc.) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 52 may incorporate electronic, magnetic, optical, and/or other types of storage media. Note that the memory 52 can have a distributed architecture, where various components are situated remote from one another, but can be accessed by the processor 51.

The software in the memory 52 may include one or more separate programs, each of which comprises an ordered listing of executable instructions for implementing logical functions. The software in the memory 52 includes a suitable operating system (O/S) 54, compiler 55, source code 56, and one or more applications 57 in accordance with exemplary embodiments.

The application 57 comprises numerous functional components such as computational units, logic, functional units, processes, operations, virtual entities, and/or modules.

The operating system 54 controls the execution of computer programs, and provides scheduling, input-output control, file and data management, memory management, and communication control and related services.

Application 57 may be a source program, executable program (object code), script, or any other entity comprising a set of instructions to be performed. When a source program, then the program is usually translated via a compiler (such as the compiler 55), assembler, interpreter, or the like, which may or may not be included within the memory 52, so as to operate properly in connection with the operating system 54. Furthermore, the application 57 can be written as an object oriented programming language, which has classes of data and methods, or a procedure programming language, which has routines, subroutines, and/or functions, for example but not limited to, C, C++, C #, Pascal, BASIC, API calls, HTML, XHTML, XML, ASP scripts, JavaScript, FORTRAN, COBOL, Perl, Java, ADA, .NET, and the like.

The I/O devices 53 may include input devices such as, for example but not limited to, a mouse, keyboard, scanner, microphone, camera, etc. Furthermore, the I/O devices 53 may also include output devices, for example but not limited to a printer, display, etc. Finally, the I/O devices 53 may further include devices that communicate both inputs and outputs, for instance but not limited to, a network interface controller (NIC) or modulator/demodulator (for accessing remote devices, other files, devices, systems, or a network), a radio frequency (RF) or other transceiver, a telephonic interface, a bridge, a router, etc. The I/O devices 53 also include components for communicating over various networks, such as the Internet or intranet.

When the computer 50 is in operation, the processor 51 is configured to execute software stored within the memory 52, to communicate data to and from the memory 52, and to generally control operations of the computer 50 pursuant to the software. The application 57 and the operating system 54 are read, in whole or in part, by the processor 51, perhaps buffered within the processor 51, and then executed.

When the application 57 is implemented in software it should be noted that the application 57 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:
1. A luminaire comprising:
a lighting element having different output lighting levels;
a first input adapted to be connected to an AC supply;
a battery integrated with the luminaire;
a second input (16) adapted to be connected to the battery;
a power converter connected to the first input and adapted to convert AC power from the AC supply to power the lighting element;
an interface adapted to receive a control signal identifying a power factor associated with the AC supply, wherein said control signal is associated with the lighting element and depending on the different output lighting level; and
a controller adapted to:
select an amount of power to be supplied from the first input to the lighting element or an amount of power to be supplied from the second input to the lighting element based on the power factor associated with the AC supply and according to said control signal, wherein the power factor indicates a ratio between a real power and an apparent power associated with the AC supply.

2. The luminaire as claimed in claim 1, wherein the controller is adapted to select an amount of power to be supplied from the first input and an amount of power to be supplied from the second input to the lighting element, further according to the prevailing total power, kVA, and real power energy tariff.

3. The luminaire as claimed in claim 1, wherein said controller is adapted to isolate the power conversion from the AC supply when selecting power from said second input.

4. The luminaire as claimed in claim 1, wherein said controller is adapted to select power from only one of the first input and said second input according to said control signal.

5. The luminaire as claimed in claim 1, wherein said controller is adapted to select the second input in response to the control signal indicating a power factor of the luminaire itself lower than a first threshold and/or select the first input in response to the control signal indicating a power factor of the luminaire itself higher than a second threshold.

6. The luminaire as claimed in claim 5, wherein said interface comprises:
   a detector to detect the power factor of the power converter; or
   a communication module to receive the control signal from a remote device which is coupled to a set of electrical luminaires including the present electrical luminaire.

7. The luminaire as claimed in claim 1, wherein said different output lighting levels comprises at least any one of:
   different output brightness;
   different output color/color temperature; and
   different beam angle.

8. The luminaire as claimed in claim 1, wherein said controller is adapted, at off peak hours, to:
   determine if a power factor of the power converter itself is higher than a third threshold, and if it is:
   to select the first input in response to the control signal indicating that a power factor of a system of other appliances is lower than a fourth threshold; and
   to select the second input in response to the control signal indicating that the power factor of the system of other appliances is higher than the fourth threshold.

9. The luminaire as claimed in claim 1, wherein the power factor associated with the AC supply comprises the combination of the harmonic power factor and the displacement power factor.

10. A system of appliances connected to a shared AC supply, wherein at least one appliance is the luminaire as claimed in claim 1, and wherein the system further includes one or more of:
    a heating, ventilation and air conditioning appliance; and
    IT system appliances.

11. A method controlling an electrical luminaire having an output lighting element having different output lighting levels, comprising:
    providing access to an AC supply to the luminaire and performing power conversion thereby to convert AC power from the AC supply for supply to the lighting element;
    providing access to an battery integrated in the luminaire;
    receiving or generating a control signal relating to a power factor associated with the AC supply, wherein said control signal is associated with the lighting element and depending on the different output lighting levels; and
    selecting an amount of power to be supplied from the AC supply or an amount of power to be supplied from the battery to the output lighting element based on the power factor associated with the AC supply and according to said control signal, wherein the power factor indicates a ratio between a real power and an apparent power associated with the AC supply.

12. The method as claimed in claim 11, wherein the step of selecting is for only selecting the battery in response to the control signal indicating a power factor of the luminaire itself lower than a first threshold and/or only selecting the AC supply in response to the control signal indicating a power factor of the luminaire itself higher than a second threshold.

13. A non-transitory computer readable medium comprising instructions when executed by one or more processors of a computer, cause the one or more processors to perform the method of claim 12.

14. The method as claimed in claim 11, wherein said different output lighting levels comprises any one of:
    different output brightness;
    different output color/color temperature; and
    different beam angle.

\* \* \* \* \*